United States Patent [19]

Moucha

[11] Patent Number: 4,932,550
[45] Date of Patent: Jun. 12, 1990

[54] PRESSURE COOKER INTERLOCK

[75] Inventor: Waldimer M. Moucha, Chippewa Falls, Wis.

[73] Assignee: National Presto Industries, Inc., Eau Claire, Wis.

[21] Appl. No.: 397,978

[22] Filed: Aug. 23, 1989

[51] Int. Cl.$^5$ .................................................. B65D 45/00
[52] U.S. Cl. .................................. 220/208; 220/298; 220/318; 99/403
[58] Field of Search .............. 220/202, 203, 208, 298, 220/299, 316, 318; 99/403, 646 C; 126/389, 373, 374

[56] References Cited

U.S. PATENT DOCUMENTS

| | | | |
|---|---|---|---|
| 2,538,583 | 1/1951 | Morrison, Jr. | 126/388 |
| 2,566,008 | 8/1951 | Westby | 220/44 |
| 2,584,759 | 2/1952 | Swenson | 220/298 |
| 2,614,722 | 10/1952 | Wyman | 220/316 |
| 2,627,997 | 2/1953 | Wittenberg | 220/40 |
| 3,559,839 | 2/1971 | Seethaler | 220/298 |
| 3,645,418 | 2/1972 | Oberlander | 220/298 |
| 3,973,694 | 8/1976 | Tess | 220/206 |
| 4,103,801 | 8/1978 | Walker | 220/316 |
| 4,162,741 | 7/1979 | Walker et al. | 220/316 |
| 4,251,007 | 2/1981 | Behnisch | 220/316 |
| 4,396,130 | 8/1983 | Robinson | 220/316 |
| 4,423,825 | 1/1984 | Baumgarten | 220/316 |
| 4,512,495 | 4/1985 | Bauer et al. | 220/316 |
| 4,541,543 | 9/1985 | Elexpuru | 220/316 |
| 4,620,643 | 11/1986 | Sebillotte | 220/316 |
| 4,717,041 | 1/1988 | Elexpuru | 220/316 |

FOREIGN PATENT DOCUMENTS 1038865 10/1953 France .
2484817 12/1981 France .

*Primary Examiner*—Paul T. Sewell
*Assistant Examiner*—Jacob K. Ackun, Jr.
*Attorney, Agent, or Firm*—Merchant, Gould, Smith, Edell, Welter & Schmidt

[57] ABSTRACT

A interlock structure for use with a pressure cooker is disclosed. The interlock prevents the pressurization of the vessel if the lid is not securely attached to the pressure cooker body. The interlock also prevents the removal of the lid until the pressure within the vessel has dropped below a preset maximum.

10 Claims, 3 Drawing Sheets

PRESSURE COOKER INTERLOCK

BACKGROUND OF THE INVENTION

The present invention relates generally to pressure cookers and more particularly to a pressure cooker cover interlock. The interlock prevents pressurizing the pressure cooker if the cover is not completely closed and the interlock prevents opening the cover if the pressure cooker is pressurized.

This invention includes a locking device which prevents a build up of pressure when the cover is not securely locked onto the pressure cooker body. This locking device also prevents removal of the cover when the pressure inside the pressure cooker body is greater than 1 p.s.i. The interlock function is a valuable feature since it may prevent improper use of the pressure cooker. This interlock also, exhibits a simplified design which results in reduced manufacturing costs.

The prior art, reflected by U.S. Pat. No. 4,620,643, to Sebillotte teaches a thumb-actuated locking device which cooperates with a valve stem in the lid to prevent closure of the valve when the two handles are not in a "locked position." This locking device also prevents opening of the lid when the valve is in a "closed position." The locking device consists of a push rod mounted in the handle of the lid, which locks the two handle portions together when the vessel is pressurized. The valve stem enters the hole of the locking member when the two handles are in the locked position, and the vessel is under pressure. The lid may be opened after the pressure in the vessel drops and the valve stem drops out of the hole. The control button is then pushed to disengage the push-rod from a locking recess in the lower handle.

French Patent No. 2,484,817, filed May 11 1979, also shows a pressure-activated interlock system which uses a thumb-switch to retract a lock mechanism.

Walker et al. U.S. Pat. No. 4,162,741, also describes a pressure-activated interlock. A pressure operated plunger located in the cover cooperates with a tab or abutment mounted inside the body of the cooker. This interlock inhibits the removal of the cover when the cooker is pressurized and prevents pressure build up in the vessel when the cover is incompletely locked to the body. This locking device consists of a cylindrical stem located within the cover and a horizontal abutment located on the interior wall of the vessel. The stem hangs from an opening in the cover when the vessel is unpressurized the catch portion of the stem hangs below the abutment and is free to pass beneath it. If the cover is not rotated far enough to completely lock it to the body, as the stem rises with increasing pressure inside the vessel and the catch portion catches on the underside of the abutment preventing the sealing of the opening. This action prevents pressurization of the cooker. However, if the cover is properly positioned on the body, the catch portion rotates clear of the abutment and rises with increasing pressure to seal the opening, thus permitting pressurization. While in the sealed position, rotation of the cover is prevented by the catch portion which is now located side by side with the abutment.

SUMMARY OF THE INVENTION

In contrast to this prior art, the interlock of the present invention does not require a thumb-switch to operate the interlock and does not include an abutment located inside the cooker body.

The invention includes a locking slide located in the cover handle. The slide carries a locking pin which engages a lug on the body to lock the cover in the closed position. The slide has an aperture in it. A pressure operated plunger cooperates with the aperture to perform the interlock function. If vessel is not fully closed the aperture is not aligned with the plunger. Consequently the plunger cannot enter the aperture to permit pressurization of the vessel. The locking slide also prevents the vessel from being opened if the internal pressure has not dropped below a safe level. While the plunger is retained within the aperture under pressure, the locking pin engages a body lug and prevents rotation of the lid. However, once the pressure has dropped, the plunger drops out of the aperture releasing the locking slide. This action permits the body mounted cam lug to displace the locking slide during handle rotation.

BRIEF DESCRIPTION OF THE DRAWING

In the accompanying drawings, in which like reference numerals indicate corresponding structures throughout the views.

DETAILED DESCRIPTION OF THE PREFERRED EMBODIMENT

Figure 1:
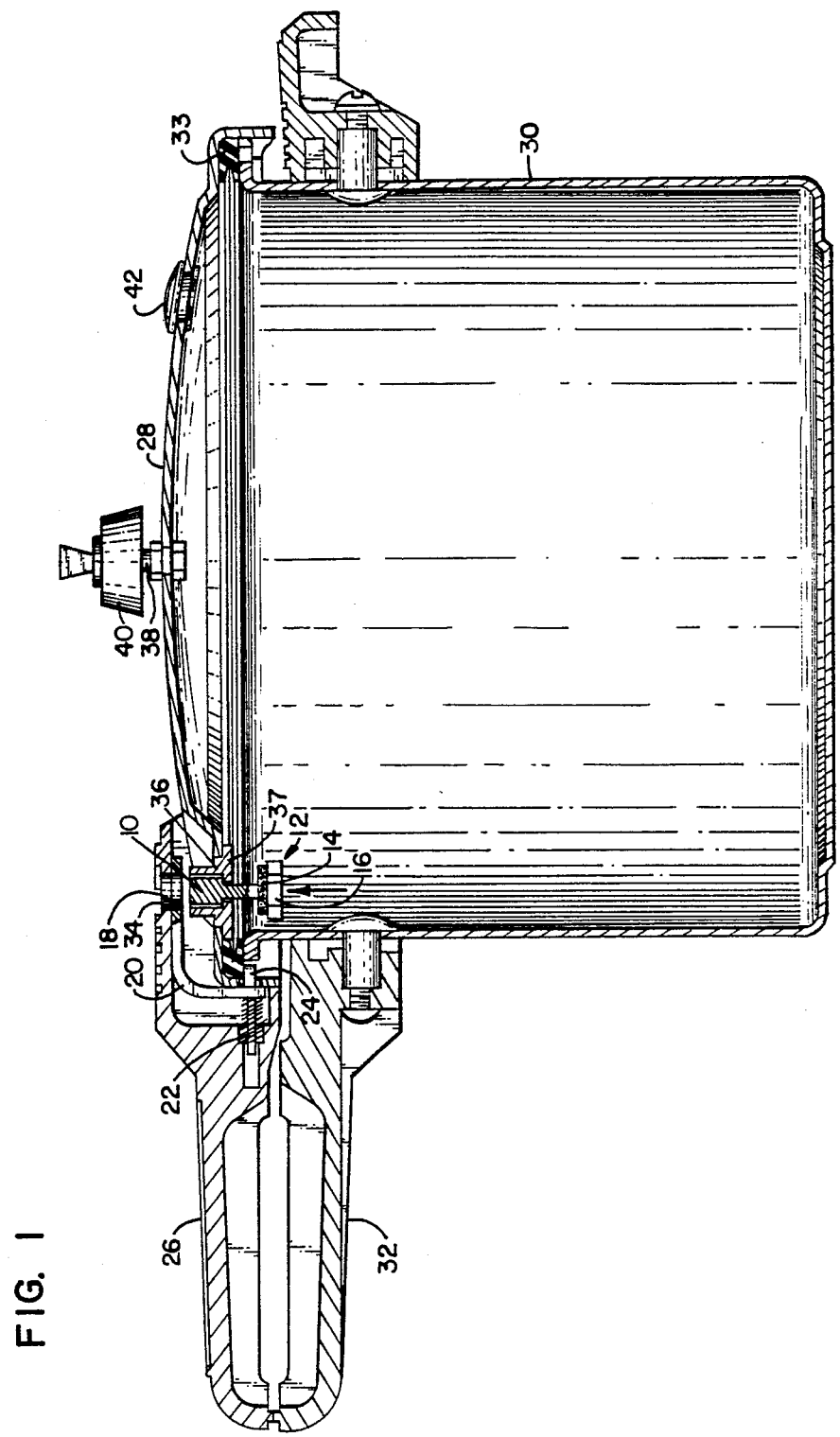
FIG. 1 is a side view of the pressure cooker.

FIG. 1 is a side view illustrating the pressure-activated locking mechanism. The figure shows a pressure cooker comprising a cover 28 located on a body 30. A cover handle 26 is attached to the cover 28, and a body handle 32 is attached to the body 30. In the closed position shown in the Figure, the cover handle 26 is directly over the body handle 32, and the cover 28 is fully sealed and seated on the body 30.

The pressure-activated locking mechanism locks the cover 28 to the body 30 when the vessel is pressurized. This locking mechanism also prevents pressurization of the vessel when the cover is not properly sealed to the body.

Figure 3:
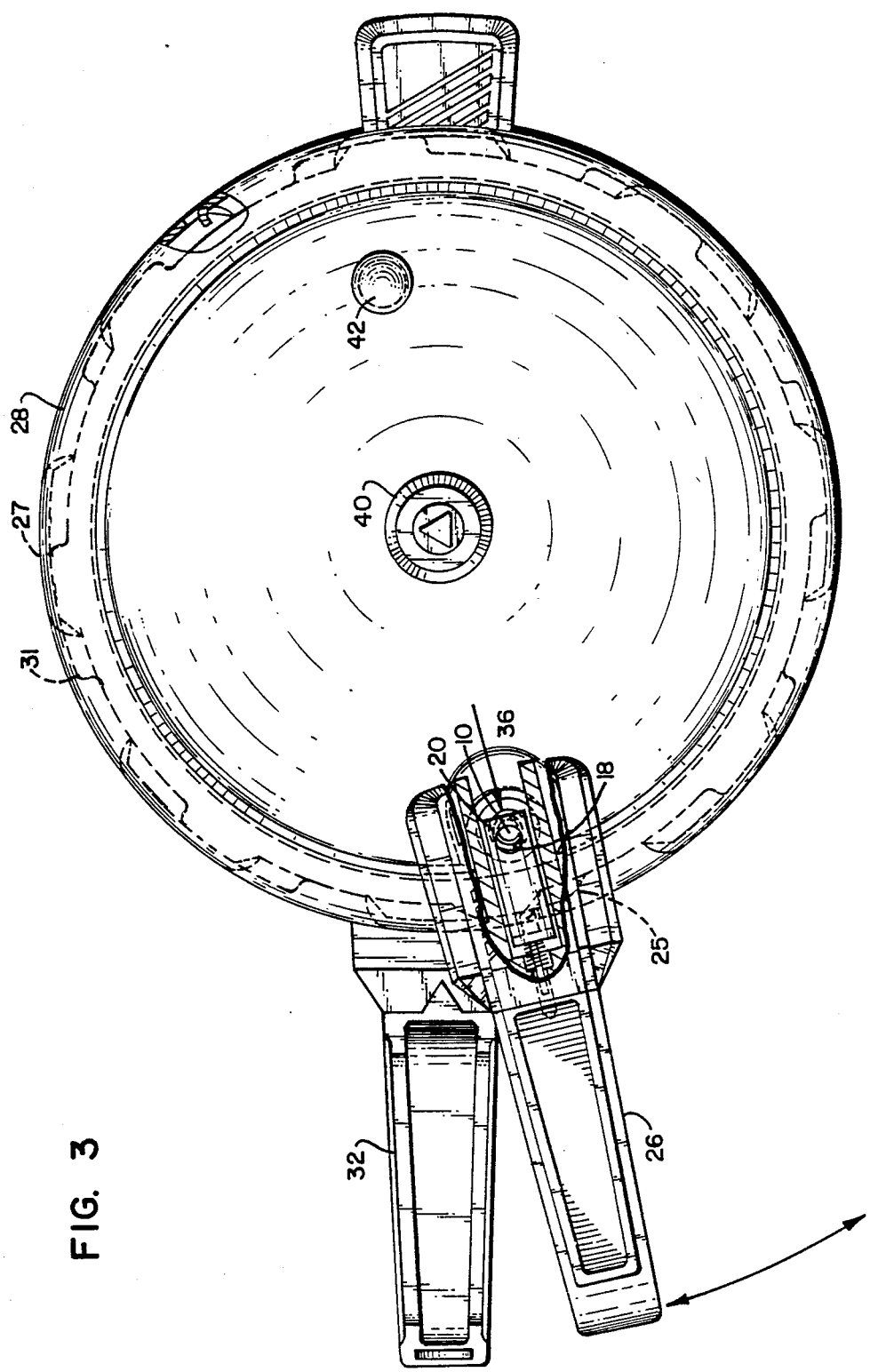
FIG. 3 is a top view of the pressure cooker with the cover in a partially closed position.

The pressure-activated locking mechanism comprises a lock pin 24 and a pressure-activated plunger assembly 12. The lock pin is located in the cover handle 26 and attached to the lock slide 20. The lock pin 24 is loaded on a coil spring 22 which holds it in place against the body cam lug 25. The body lug 25 adjacent the handle 32 has a cam surface formed thereon. The lock pin 24 acts as a cam follower and follows the cam surface of body cam lug 25 from a "closed and locked" position when the lock pin 24 is on the cam base 23 surface as shown in FIG. 1, to an "open and unlocked" position as shown in FIG. 3, when the handle 26 is rotated with respect to handle 32. As the lock pin 24 moves across the cam body lug 25, the lock slide 20 moves back and forth across the cover bushing opening 36 and cover handle opening 34.

When the cover 28 is properly sealed to the body 30, the lock slide aperture 18 is lined up with the cover bushing opening 36 and the cover handle opening 34. This allows the pressure-activated plunger assembly 12 to rise with increasing pressure within the vessel into the handle opening 34. Thus, the plunger assembly 12 engages the lock slide aperture 18 preventing the lock slide 20 from moving. This also prevents the attached lock pin 24 from retracting to move back over the body cam lug 25. Therefore, the cover 28 cannot be removed from the body 30 as long as the pressure inside the vessel is such that the plunger assembly 12 is raised to engage the lock slide aperture 18.

The plunger assembly 12 comprises a shaft 10, a gasket 14 and a retainer nut 16. The shaft 10 catches on the bushing 37 within the cover bushing opening 36 to hold the plunger assembly 12 when the vessel is unpressurized. The gasket 14 seals the underside of the cover bushing opening 36 when the vessel is pressurized and the cover 28 is properly sealed to the body 30. The retainer nut 16 threads onto the end of the shaft 12 to hold the gasket 14 in place.

The cover 28 also includes a vent pipe 38, a pressure regulator 40 and an over pressure plug 42. The pressure regulator 40 sits on top of the vent pipe 38 and controls the temperature and pressure within the vessel by releasing steam through the vent pipe 38. The over pressure plug 42 releases in the event of an excess build up of pressure within the vessel.

Figure 2:
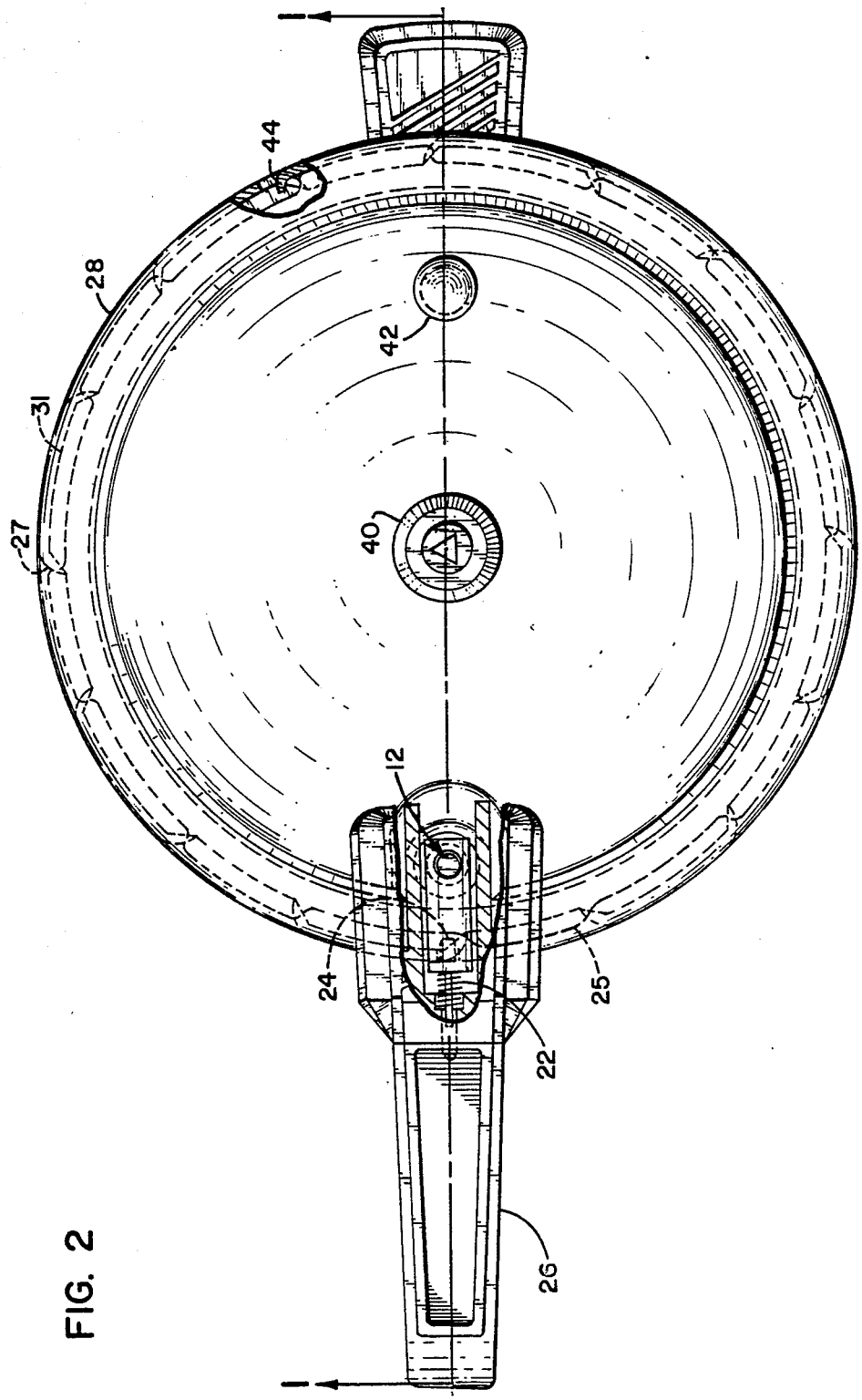
FIG. 2 is a top view of the pressure cooker with the cover in the closed position.

FIG. 2 is the top view of the vessel when the cover 28 is properly sealed to the body 30. This view shows the plunger assembly 12 aligned directly under the lock slide aperture 18. In this position, the plunger assembly 12 is free to rise with increasing pressure and engage the lock slide aperture 18, thus holding the lock slide 20 and the attached lock pin 24 in place. FIG. 2 also shows the lock pin 24 engaging the cam base of the body cam lug 25. Since the lock pin 24 is unable to move when the plunger assembly 12 is engaging the lock slide aperture 18, it cannot retract in order to follow the cam edge of the body cam lug 25. Consequently, in this configuration, the cover 28 cannot be removed from the body 30.

In addition, FIG. 2 shows the cover lugs 27 which are positioned around the periphery of the cover. These lugs cooperate with the body lugs 31 located around the periphery of the top of the body. When the cover 28 is rotated onto the body 30, the cover lugs 27 are forced beneath the body lugs 31 and also the body cam lug 25 which engages the lock pin 24. In this position, the gasket, sealing ring 33 and the cover 28 are drawn against the rim of the body 30 to create a fluid tight seal between the cover 28 and the body 30. The cover stop 44 is also shown in FIG. 2. The cover stop 44 engages one of the body lugs 31 to prevent the cover 28 from being over rotated past the closed position shown.

FIG. 3 shows a top view of the cooker when the cover 28 is in the partially closed position and not properly sealed to the body 30. The lock pin 24 is shown positioned on the nose of the body cam lug 25. The cam action of cam lug 25 has caused the lock pin 24 to retract into the cover handle 26, thus causing the lock slide 20 to also be displaced radially in the cover handle 26. The displacement of the lock slide 20 causes the lock slide aperture 18 to be misaligned with the cover bushing opening 36 and the plunger assembly 12. This prevents the plunger 12 assembly from rising to engage the lock slide aperture 18 and seal the underside of the cover bushing opening 36. When the cover bushing opening 36 is not sealed, pressure cannot build up inside the vessel. Therefore, the vessel cannot be pressurized when the cover 28 is not properly seated on the body 30.

What is claimed is:

1. A pressure cooker comprising:
(A) a cover (28) having a cover handle (26) and having a plurality of cover lugs (27) spaced around the periphery of said cover,
(B) a body (30) having a plurality of body lugs (31) spaced around the periphery of said body for rotational engagement with said cover lugs for holding said cover on said body when said cover is rotated into a closed position with respect to said body, and for permitting removal of said cover when said cover is rotated into an open position,
(C) a body cam lug 25 having a cam surface, said cam surface including a cam nose 29, and including a cam base 23,
(D) a lock pin (24) engaging said cam surface for positioning a lock slide (20) with respect to a pressure activated plunger assembly (12), said lock slide coupled to said lock pin and having an aperture (18) formed therein for accepting a pressure activated plunger assembly (12) when said lock pin is on said cam base 23, whereby removal of said cover is prevented when said cooker is under pressure, and for rejecting a pressure activated plunger assembly (12) when said lock pin is on said cam nose 29, thereby preventing pressurization of said cooker when said cover is in a partially closed position.

2. A pressure cooker comprising:
(A) a cover (28) having a cover handle (26) and having a plurality of cover lugs (27) spaced around the periphery of said cover,
(B) a body (30) having a plurality of body lugs (31) spaced around the periphery of said body for rotational engagement with said cover lugs for holding said cover on said body when said cover is rotated into a closed position with respect to said body, and for permitting removal of said cover when said cover is rotated into an open position,
(C) a body cam lug 25 having a cam surface, said cam surface including a cam nose 29, and including a cam base 23,
(D) a lock pin (24) engaging said cam edge for positioning a lock slide (20) with respect to a pressure activated plunger assembly (12), said lock slide coupled to said lock pin and having an aperture (18) formed therein for accepting a pressure activated plunger assembly (12) when said lock pin is on said cam base, whereby removal of said cover is prevented when said cooker is under pressure.

3. A pressure cooker comprising:
(A) a cover (28) having a cover handle (26) and having a plurality of cover lugs (27) spaced around the periphery of said cover,
(B) a body (30) having a plurality of body lugs (31) spaced around the periphery of said body for rotational engagement with said cover lugs for holding said cover on said body when said cover is rotated into a closed position with respect to said body, and for permitting removal of said cover when said cover is rotated into an open position,
(C) a body cam lug 25 having a cam surface, said cam surface including a cam nose 29, and including a cam base 23,
(D) a lock pin (24) engaging said cam edge for positioning a lock slide (20) with respect to a pressure activated plunger assembly (12), said lock slide coupled to said lock pin and having an aperture (18) formed therein for rejecting a pressure activated plunger (12) when said lock pin is on said cam nose, thereby preventing pressurization of said cooker when said cover is in a partially closed position.

4. The cooker of claim 1 wherein said lock slide is mounted in said cover handle (26).

5. The cooker of claim 1 wherein said lock pin is mounted in said cover handle (26).

6. The cooker of claim 1 wherein said pressure activated plunger comprises:
   a bushing located in an aperture in said cover,
   a shaft member slidably mounted in said bushing for pressure actuation,
   a retaining nut mounted on said shaft member for retaining said shaft member in said bushing,
   a gasket mounted on said shaft member and retained on said shaft member by said retaining nut for sealing said bushing when said gasket is seated on said bushing.

7. The cooker of claim 1 further including a spring for forcing said lock pin into engagement with said cam lug.

8. The cooker of claim 1 further comprising a vent pipe covered by a pressure regulator for controlling the pressure and temperature of said cooker.

9. The cooker of claim 1 further comprising a safety vent having a over pressure plug for venting said cooker if the pressure exceeds a predetermined value.

10. The cooker of claim 1 further comprising a cover stop for preventing the rotation of said cover past the closed position.

* * * * *